April 9, 1935.    G. J. KOEHL    1,996,999
SHOCK ABSORBER
Filed Oct. 8, 1930
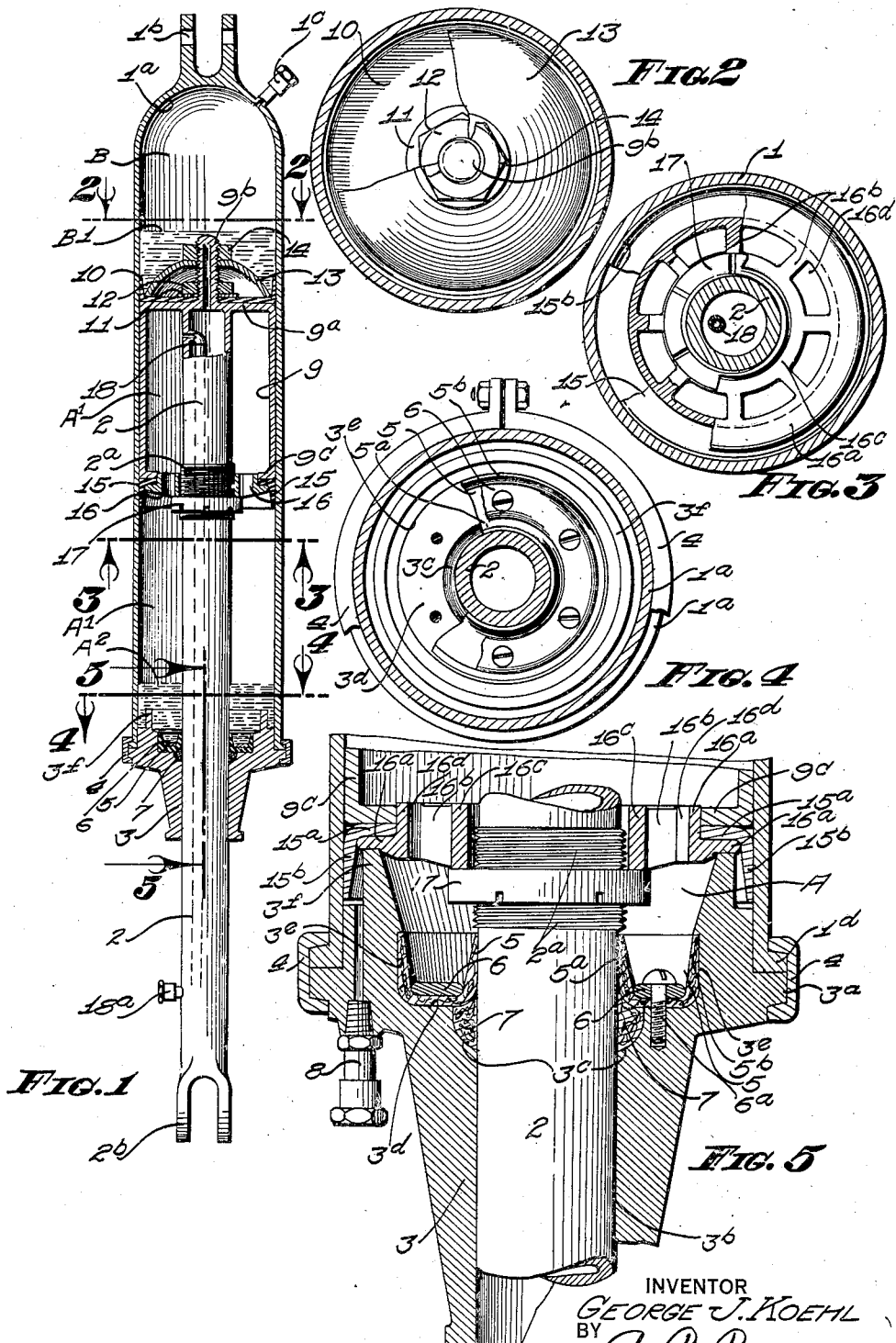
INVENTOR
GEORGE J. KOEHL
BY
A. B. Bouman
ATTORNEY Patented Apr. 9, 1935

1,996,999

UNITED STATES PATENT OFFICE 1,996,999

SHOCK ABSORBER

George J. Koehl, San Diego, Calif.

Application October 8, 1930, Serial No. 487,107

2 Claims. (Cl. 267—65)

My invention relates to shock absorbers, and the objects of my invention are:

First: To provide a shock absorber which is particularly adapted for use in connection with airplanes, in such cases forming a strut of the landing gear;

Second: To provide a shock absorber of the hydraulic type in which leakage of fluids from within is reduced to a minimum;

Third: To provide a shock absorber in which the amount of expansion and contraction in its length may be relatively great for its over-all length, thereby providing a shock absorber which cushions extreme shocks due to poor landings, and reducing the strain on other parts of the airplane;

Fourth: To provide a shock absorber in which the resistance to movement may be varied to suit the weight of various airplanes and the uses to which they are put;

Fifth: To provide a shock absorber of this type, which, after once being assembled, may be adjusted entirely from the outside thereof;

Sixth: To provide a shock absorber of this class having relatively few parts, all of which may be light of construction;

Seventh: To provide a shock absorber which offers low parasite resistance;

Eighth: To provide a novel means of sealing the joints of this type of shock absorber; and Ninth: To provide on the whole a novelly constructed type of shock absorber which is simple of construction proportional to its functions, durable, efficient in its action, and which will not readily deteriorate or get out or order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon, which form a part of this application, in which:

Figure 1 is a longitudinal sectional view of my shock absorber with parts and portions shown in elevation to facilitate the illustration; Fig. 2 is an enlarged transverse sectional view through 2—2 of Fig. 1; Fig. 3 is another enlarged transverse sectional view on line 3—3 of Fig. 1; Fig. 4 is an enlarged transverse sectional view through 4—4 of Fig. 1; and Fig. 5 is a still further enlarged fragmentary longitudinal sectional view through 5—5 of Fig. 1, with the piston rod in its extreme outer position relative to the cylinders.

Similar characters of reference refer to similar parts and portions throughout the several views of the drawing.

Cylinder 1, piston rod 2, piston rod bearing 3, locking ring 4, channel ring sealing washer 5, securing ring 6, packing 7, drain valve 8, piston 9, upper sealing washer 10, washer 11, nut 12, deflecting dome 13, nut 14, lower sealing washer 15, washer retaining ring 16, washer retainer nut 17, and air supply tube 18, constitute the principal parts and portions of my shock absorber.

A relatively long cylinder 1 is provided, having a dome-shaped closed upper end 1a. Extending upwardly from this upper end is a fitting 1b arranged to attach to a suitable portion of an airplane, not shown. The dome-shaped end 1a is fitted with an air valve 1c, which may be in the form of a check valve similar to the type used for automobile tires.

A piston rod is provided which extends into the cylinder through the lower or open end thereof. The piston rod is centered relative to the cylinder 1 by means of a piston rod bearing or sleeve 3. The sleeve 3 is fitted into the lower or open end of the cylinder 1, and is wedged in such relation by a locking ring 4, which fits around corresponding flanges 1d and 3a of the cylinder 1 and piston rod bearing 3.

The lower portion of the bearing 3 comprises the bearing portion which snugly receives the piston rod 2. Above the bearing portion 3b the bore of the bearing 3 is increased in diameter. The portion of the increased bore of the bearing 3 contiguous to the bearing portion 3b forms with the piston rod 2, a packing receiving channel 3c, which is substantially wedge-shaped and open toward the inside of the cylinder 1. Above the packing receiving channel, the bore is further enlarged forming a shoulder 3d extending radially outwardly from the open end of the channel 3c. This shoulder 3d is the base of a sealing washer receiving channel 3e, the inner wall of which is the piston rod 2.

A sealing washer 5 in the form of an annular channel with upturned side walls 5a and 5b fits in the channel 3e. The base portion of the sealing washer connecting its side walls 5a and 5b is secured to the shoulder 3d by a securing ring 6 having screws 6a extending therethrough and into the material of the bearing 3. The inner portion of the sealing washer including the inner side wall 5a extends over and closes the open or inner side of the packing receiving channel 3c. The inner side wall 5a yieldably bears against the piston rod 2 and is beveled so that its inner surface converges upwardly or towards the interior of the cylinder 1. This causes the inner side wall or sleeve 5a to increase its pressure against the piston rod with increased pressure within the cylinder 1.

The channel 3c is filled with packing 7. Pressure from within the lower chamber, designated A, of the cylinder causes the portion of the sealing washer overhanging the packing chamber 3c to increase its pressure against the packing and force it tightly against the piston rod so as to form a tight though sliding joint therewith, thus enabling the chamber A to maintain considerable pressure for relatively long periods.

Fitted in the bearing 3, and communicating with the chamber A is a check valve 8 for draining purposes.

Secured to the inner end of the piston rod 2, is a piston 9. The piston 9 is in the form of a hollow cylinder closed at its upper end by a head 9a. The piston rod 2 extends within the piston 9 and is attached to its head 9a.

Extending upwardly from the head 9a of the piston is a threaded shank portion 9b which is co-axial with the piston rod 2. Fitted over the shank 9b and resting against the head 9a, is a cup-shaped upper sealing washer 10, the walls or skirt 10a of which extend upwardly and engage the inner walls of the cylinder 1. The central portion of the upper sealing washer 10 is held in position by a washer 11 and nut 12.

Also fitted over the shank 9b, is a deflection dome 13, which is in the form of a spherical segment. A nut 14 fits over the dome 13. The dome 13 is of a large enough diameter to bear against the margin of the washer 10, adjacent the upturned rim or skirt thereof, so that when the nut 14 is tightened down, pressure is evenly distributed around the margins of the sealing washer. The dome 13 greatly increases the radial pressure outwardly against the skirt 10a, so as to hold it firmly against the inner walls of the cylinder 1, and effect a tightly sealed joint therewith.

The lower end of the piston 9 is provided with an internal flange 9c, against the under surface of which is secured the ring portion 15a of a lower sealing washer 15. Extending from the outer periphery of the ring portion downwardly along the inner walls of the cylinder 1 is a skirt portion 15b.

The ring portion 15a is held against the flange 9c by a rim portion, designated 16a, of a retaining ring 16. Extending radially inwardly from the rim portion 16a are a plurality of webs 16b, which join to a hub portion 16c adapted to fit around the piston rod 2. The slots or openings, designated 16d, formed between the webs 16c connect the chamber A with the chamber designated A1, inside the piston.

The hub portion 16c is adapted to be engaged on its under side by a retaining nut 17, which screws onto a threaded portion 2a of the piston rod, as shown best in Figs. 3 and 5.

The piston rod bearing 3 is provided with an annular stop portion 3f, which extends upwardly therefrom in spaced relation to the walls of the cylinder 1. The stop portion 3f is adapted to engage the rim portion 16a of the retaining ring 16, when the piston is in its lowest position and the piston rod is in its extended position, as shown in Fig. 5, so as to prevent injury to the sealing washer 15.

The piston rod 2 is preferably hollow, and is provided therein with a small tube 18, which communicates with a portion A1 of the chamber A within the piston 9. The other end of the tube 18 protrudes from the extended portion of the piston rod 2, and is provided with a suitable check valve 18a.

The lower end of the piston rod 2 is provided with a suitable fitting 2b, which is adapted to connect with other portions of the landing gear, not shown.

The shock absorber is prepared for operation as follows:

Suitable oil is first forced in the valves 1c and 8, until the sealing washers 10 and 5 are well covered. Air is then pumped into valve 1c and in the valve 18a, filling both upper chambers, designated B, and the lower chamber A, with air under pressure.

The limit of pressure in the two chambers is adjusted so that when the strut is in position supporting a weight, pressure in the upper chamber B is greater than that in the lower chamber, as, for example, the pressure in the upper chamber may be 100 lbs. per square inch, while the pressure in the lower chamber is about 60 lbs. per square inch. The difference in these pressures, or 40 lbs., equals the cushioned pressure of the shock absorber. Of course, the pressures within the shock absorber vary with different airplanes.

By reason of the arrangement of the sealing washer 5 and packing 7, it is extremely difficult for the pressure in the chamber A to be lost through the connection between the piston rod and its bearing, although the piston rod is slidable. Furthermore, the shape of the deflection dome 13, by causing an increased radial shock force against the skirt of the upper washer 10, more tightly seals the joint between the piston and the cylinder so that the relative quantities of air in the two chambers A and B are maintained.

It is obvious from the construction as illustrated in the drawing and described in the foregoing specification that there is provided a shock absorber as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a shock absorber, a cylinder, an elongated cup-shaped piston hollow from end to end reciprocally mounted therein, sealing means at both ends of said piston, a piston rod joined to said piston extending from one end of said cylinder, sleeve means closing the one end of said cylinder and slidably receiving said piston rod, said piston dividing said cylinder into an upper and lower chamber and both liquid and air under pressure above atmospheric in both of said chambers, and means for introducing air into both of said chambers near the upper end thereof.

2. In a shock absorber, a cylinder, an elongated cup-shaped piston hollow from end to end reciprocally mounted therein, sealing means at both ends of said piston, a piston rod joined to said piston extending from one end of said cylinder, sleeve means closing the one end of said cylinder and slidably receiving said piston rod, said piston dividing said cylinder into an upper and lower chamber and both liquid and air under pressure above atmospheric in both of said chambers, and means for introducing air into both of said chambers near the upper end thereof, the means for introducing air into the lower chamber extending through the piston rod from the extremity of said cylinder.

GEORGE J. KOEHL.